(12) United States Patent
Walecki et al.

(10) Patent No.: US 7,502,121 B1
(45) Date of Patent: Mar. 10, 2009

(54) TEMPERATURE INSENSITIVE LOW COHERENCE BASED OPTICAL METROLOGY FOR NONDESTRUCTIVE CHARACTERIZATION OF PHYSICAL CHARACTERISTICS OF MATERIALS

(75) Inventors: Wojciech Walecki, San Jose, CA (US); Phuc Van, San Jose, CA (US)

(73) Assignee: Ahbee 1, L.P., San Jose, CA (US)

( * ) Notice: Subject to any disclaimer, the term of this patent is extended or adjusted under 35 U.S.C. 154(b) by 0 days.

(21) Appl. No.: 10/997,374

(22) Filed: Nov. 24, 2004

(51) Int. Cl.
*G01B 9/02* (2006.01)

(52) U.S. Cl. ........................ 356/479; 356/482

(58) Field of Classification Search ................ 356/479, 356/485, 496, 497, 501, 505, 503, 504, 482, 356/498
See application file for complete search history.

(56) References Cited

U.S. PATENT DOCUMENTS

| | | | | |
|---|---|---|---|---|
| 4,627,731 A | * | 12/1986 | Waters et al. | 356/479 |
| 5,325,177 A | * | 6/1994 | Peterson | 356/505 |
| 5,642,196 A | * | 6/1997 | Alves et al. | 356/479 |
| 5,781,295 A | * | 7/1998 | Fuchs et al. | 356/486 |
| 6,741,355 B2 | * | 5/2004 | Drabarek | 356/482 |
| 6,768,552 B2 | * | 7/2004 | Takahashi et al. | 356/479 |
| 6,842,254 B2 | * | 1/2005 | Van Neste et al. | 356/497 |

* cited by examiner

*Primary Examiner*—Patrick J Connolly (57) ABSTRACT

This invention is a device for measuring of absolute distances by means of low coherence optical interferometry. The proposed apparatus eliminates thermal of the conventional fiber optic interferometers caused by variation of the refractive index of the optical fiber material to change of the temperature.

4 Claims, 11 Drawing Sheets

TEMPERATURE INSENSITIVE LOW COHERENCE BASED OPTICAL METROLOGY FOR NONDESTRUCTIVE CHARACTERIZATION OF PHYSICAL CHARACTERISTICS OF MATERIALS

BACKGROUND OF THE INVENTION

The low coherence optical interferometry has been proven to be an effective tool for characterization of thin and ultra-thin semiconductor wafers and other materials. It is particularly valuable for the measurement of the thickness of wafers thinner than 150 µm, or wafers mounted on dielectrics materials such as tapes or sapphire plates. For these applications, standard well-established non-contact thickness gauges, such as air pressure or capacitance gauges do not provide direct physical results which meet industry process windows or require introduction of additional experimental parameters. While the bulk of effort was concentrated in the area of metrology for manufacturing of ultra thin Silicon wafers, other very promising areas include metrology of III-V materials mainly for opto-electronics and microwave applications and metrology of micro electro mechanical (MEM) structures.

It has been recognized that low coherence optical interferometry can be used to measure absolute distances between a probe and a wafer. The accurate distance ranging measurements are necessary when measuring physical characteristics of the wafer such as bow and warp. In practice, the absolute distance ranging measurements were not very accurate due to thermal drift of the optical elements of the system. The present invention reduces this effect, and in particular eliminates the influence of the thermal drift of the fiber optic components on performance of the low coherence optical interferometer.

DESCRIPTION OF THE INVENTION

Figure 1:
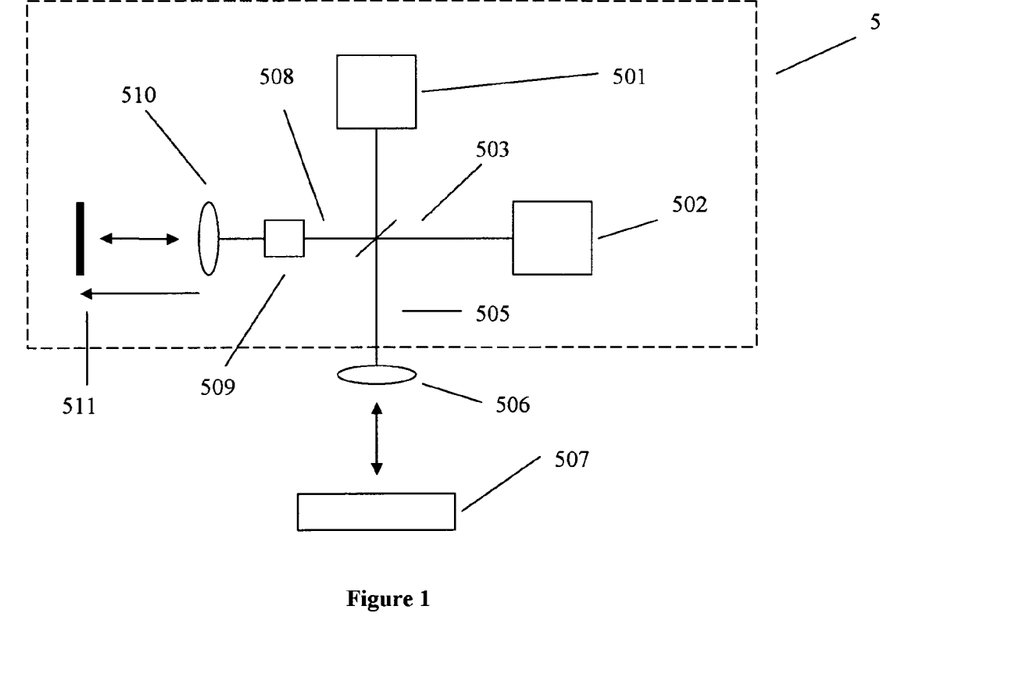
FIG. 1 represents a conventional low coherence interferometer.

The apparatus used in the measurements is a fiber optics interferometer shown in FIG. 1, which represents a low coherence Michelson interferometer. Light emitted by a low coherence source is split, by means of a beam-splitter, into two beams: the first beam is called the reference beam, which propagates in the reference arm of the interferometer; the second portion of the beam is called the signal beam, which propagates in the signal arm. The polarization of the reference beam is controlled by means of polarization controller, and is collimated by means of lens on a reflective element, made of a reflective material, such as a mirror, optical flat, partially reflective optical flat, semi and transparent materials or corner cube retro reflector. The mirror resides on a delay stage such that the length of the optical path of the reference beam is controlled by means of an optical delay stage. The reference beam is reflected from the reference movable mirror, passes again through the polarization controller and is partially transmitted by a beam-splitter and directed to a detector. The signal beam is collimated by a lens and impinges a sample. The reflected portion of the signal beam is directed by means of a beam splitter cube towards a detector.

The intensity of the optical beam impinging the detector surface $I_d$ is given by:

$$I_d = \tfrac{1}{2}(I_r + I_s) + Re\langle E_r^*(t+\tau) \cdot E(t)\rangle \qquad (1)$$

where $I_s$ and $I_r$ are signal and reference beams, $\tau$ is delay equal to difference of the optical paths of the signal and reference beams, t is time, $E_r$ and $E_s$ are electric fields of reference and signal beams respectively, and angle ⟨. . . ⟩bracket means averaging over t.

When the optical paths of the signal and reference beams differ by much more than the coherence length of the source, the intensity detected by a detector is simply equal to the first $\tau$ independent term in the Equation (1); however when the paths of the reference and signal beams differ within the coherence length, then the second term becomes comparable to the first term. This phenomenon is well known and was applied in the past for distance ranging, since the optical delay time is related to the difference in length $\Delta l$ between the reference and signal beams, by a simple formula:

$$\tau = 2 \cdot n \cdot \Delta l \qquad (2)$$

where n is the refractive index of the medium. Equation 2 implicitly assumes that the medium is non-dispersive within the bandwidth of the light source.

Figure 6:
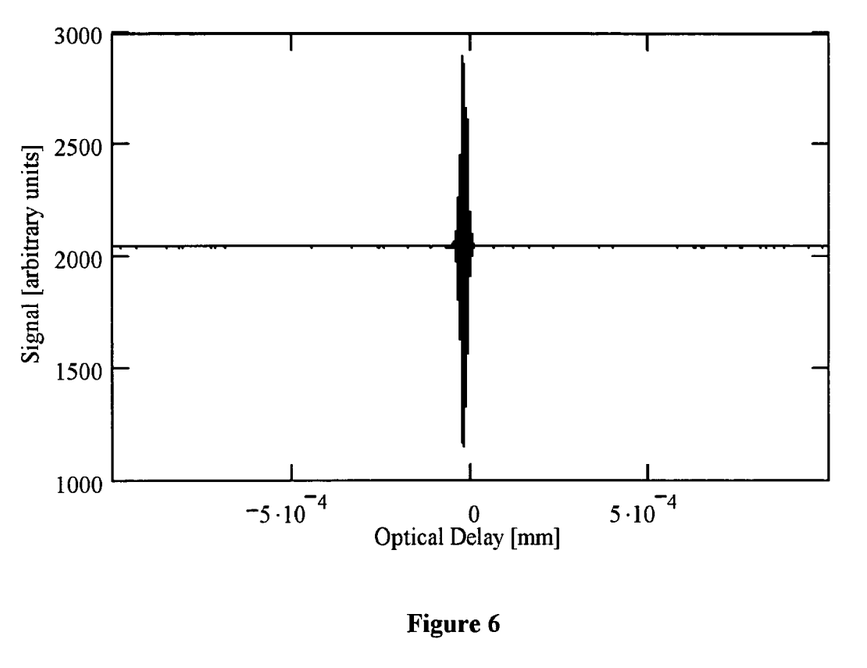
FIG. 6 depicts an interferogram of light reflected from a reflective and nontransparent sample.
Figure 7:
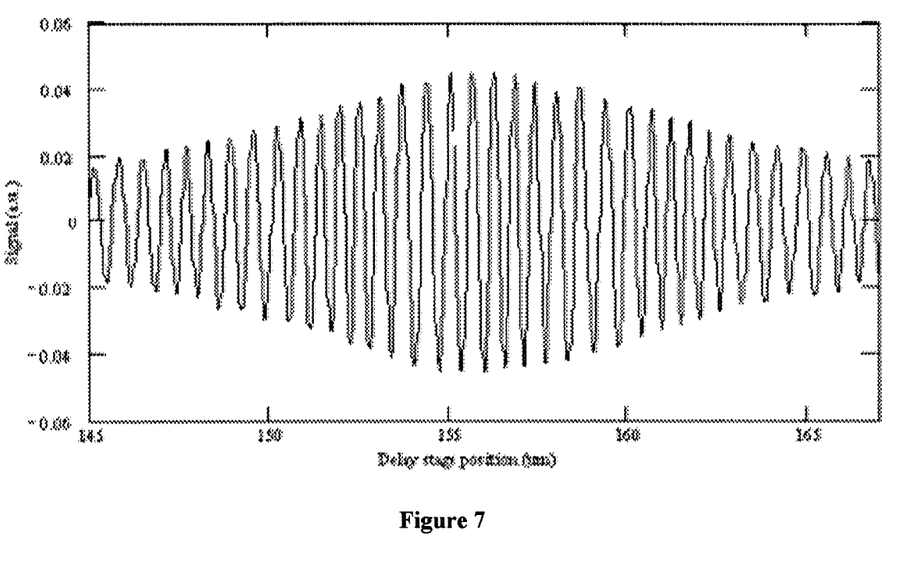
FIG. 7 is an example of an interferogram (expanded scale).

An example of the interferogram of light reflected from the surface of a reflective (and nontransparent) sample is shown in FIG. 6 and FIG. 7.

In principle, the position of the center burst can be used directly for distance ranging. The results of such a measurement are presented in FIG. 8. The result presented in FIG. 8 reveals a significant drift. Experiments in which various elements of the low coherence interferometer shown in FIG. 1 were heated, indicated that change of the optical path of the signal arm contributes the most to thermal drift, observed in FIG. 8. The temperature coefficient of the refractive index of glass is 20 ppm/° C.

This means that in the case of a 2 m optical fiber change of the optical length of the fiber is of the order of 40 microns/°C. The change of the physical length of the fiber due to physical thermal expansion is less significant. The coefficient of thermal expansion is several times smaller than the temperature coefficient of refractive index.

An insertion of one more light reflecting element (reflective base element), into the signal arm of the interferometer and placing it slightly closer to the optical fiber, connecting the probe head and the interferometer, than to the specimen to be measured, can provide one more reference point, which is independent of the thermal effect mentioned above. The distance between the new reference point and the wafer's surface can be measured instead of the wafer's surface absolute position. In the case of the thermal expansion of the fiber mentioned above, the positions of the both reflections, measured by the interferometer, will be changing synchronously and the measured distance will remain the same.

In FIG. 1 light emitted by a low coherence source 501 is split by means of a beam-splitter 503 into two beams: the first beam, called a reference beam, propagates in the reference arm of the interferometer 508, and the second beam called a signal beam propagates in the signal arm 505. The polarization of the reference beam is controlled by means of a polarization controller 509, and is collimated by means of a lens 510 on a reference arm movable mirror 511. The reference arm movable mirror 511 resides on a delay stage such that the length of the optical path of the reference beam is controlled by means of an optical delay stage 511. The reference beam is reflected from the reference arm movable mirror, passes again through a polarization controller 509 is partially transmitted by a beam-splitter 503 and directed to a detector 502. The signal beam 505 is collimated by a lens 506 and impinges a sample 507. The reflected portion of the signal beam is directed by means of a beam splitter cube 503 towards a detector 502.

Figure 2:
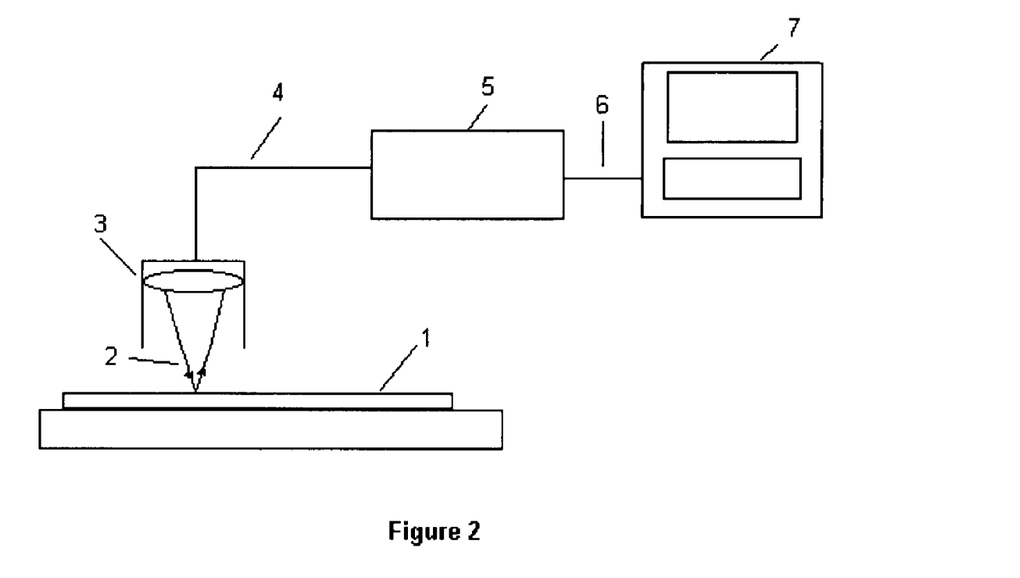
FIG. 2 represents a low coherence interferometer with a probe head, without a reflective base element, including ray paths.

In FIG. 2 a low coherence interferometer 5 has a external probe head 3, placed in proximity to the specimen 1, is connected to the interferometer by a optical fiber 4. The light 2, outgoing from the interferometer probe head 3, is reflected from the specimen 1 and collected back by the probe head 3. The electrical signal is them transferred to the computer 7 through an electrical cable 6.

Figure 3:
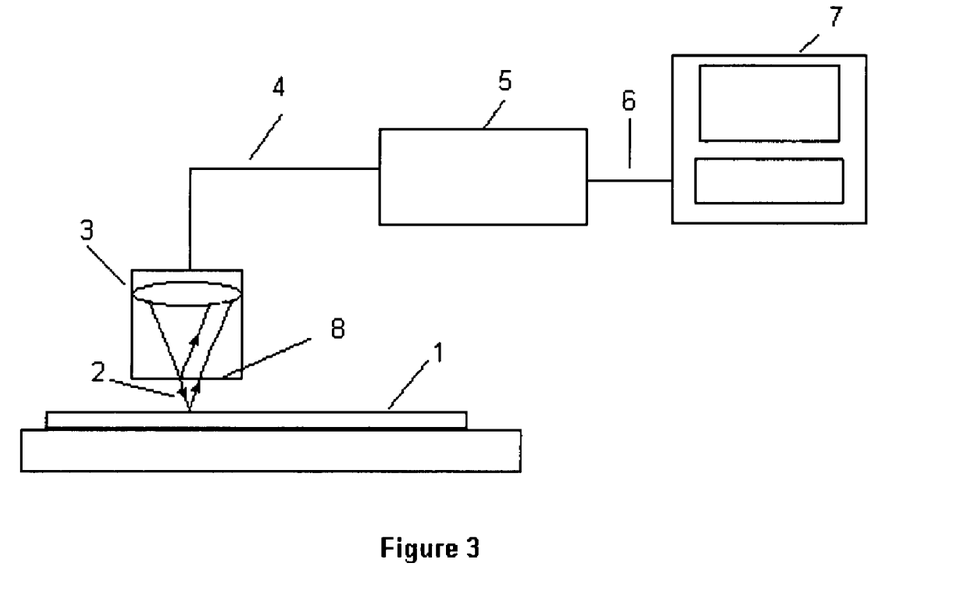
FIG. 3 represents a low coherence interferometer with a probe head, with a reflective base element in collinear configuration including ray paths.

In FIG. 3 the interferometer probe head 3 of the low coherence interferometer 5, in addition has a semi-transparent reflective base element 8 placed between the specimen 1 and the probe head 3. The portion of the light 2 outgoing from the interferometer probe head 3, is reflected from the semi-transparent interface 8, while the other portion is reflected from the specimen 1. The light is collected back by the probe head 3 and transmitted to the interferometer through an optical fiber 4. The electrical signal is them transferred to the computer 7 through an electrical cable 6.

Figure 4:
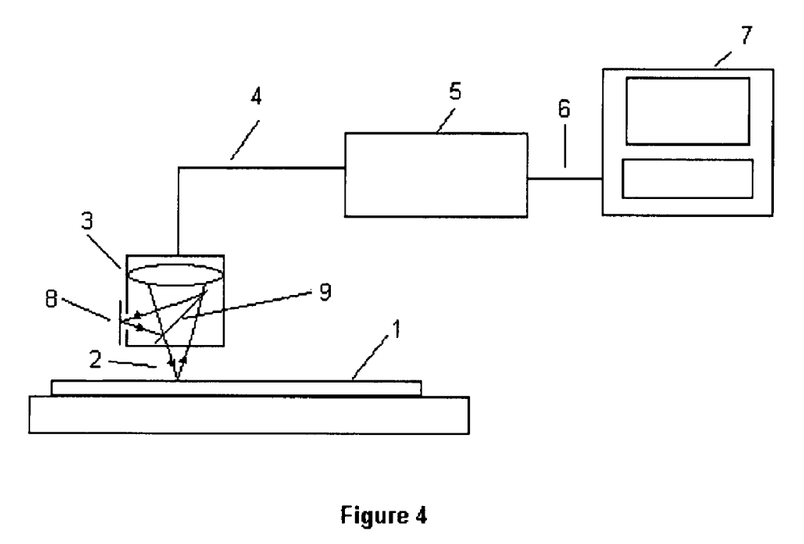
FIGS. 4 and 5 represent a low coherence interferometer with a probe head, with a reflective base element in noncollinear configurations, including ray paths.

In FIG. 4 the probe head 3 of the low coherence interferometer 5, in addition, has a flat beam splitter 9, placed between the specimen 1 and the probe head 3, and a reflective surface 8, placed on a side of the probe head 3. The portion of the light 2 outgoing from the probe head 3, is split by the flat beam splitter 9, reflected from the reflective surface 8, while the other portion is reflected from the specimen 1. The total distance from the point of the probe head from which the light emanates, to the reflective surface 8, is less, than that to the specimen 1. The light is collected back by the probe head 3 and transmitted to the interferometer through an optical fiber 4. The electrical signal is them transferred to the computer 7 through an electrical cable 6.

Figure 5:
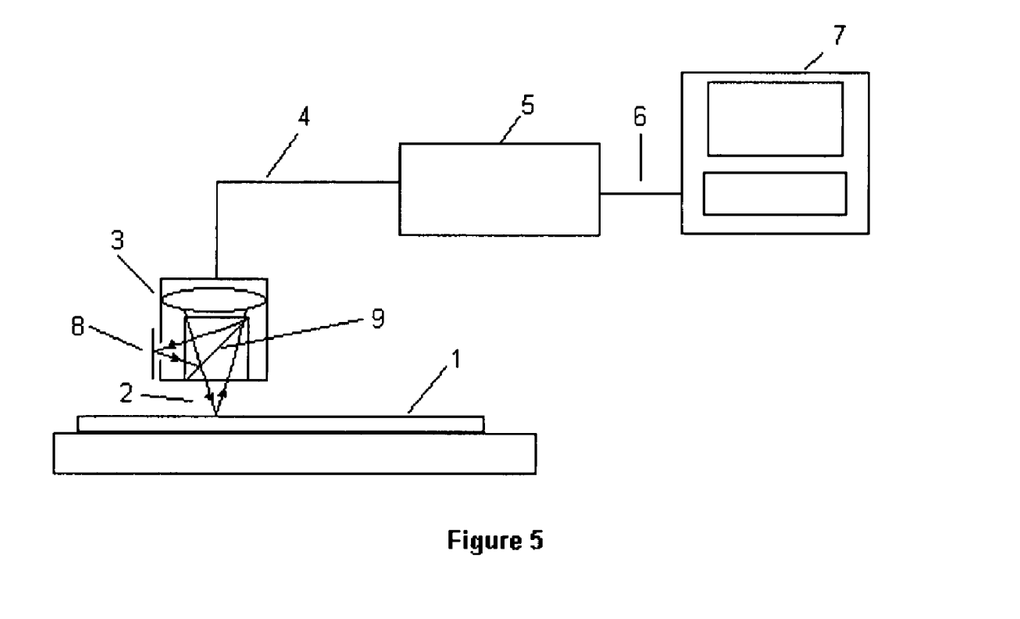

FIG. 5 repeats the embodiment shown at FIG. 4, but a cubic beam splitter 9 is used instead of a flat one.

In FIG. 6 an example is shown of the interferogram of light reflected from the surface of reflective (and nontransparent). When optical paths of the signal and reference beams are approximately equal strong interference feature is observed. This feature is referred to sometimes in Fourier transform interferometry as "center burst".

In FIG. 7 details of the center burst oscillations are revealed, which are spaced by approximately half of the wavelength of incident radiation $\lambda/2$, as shown in FIG. 7, representing an expanded interferogram.

Figure 8:
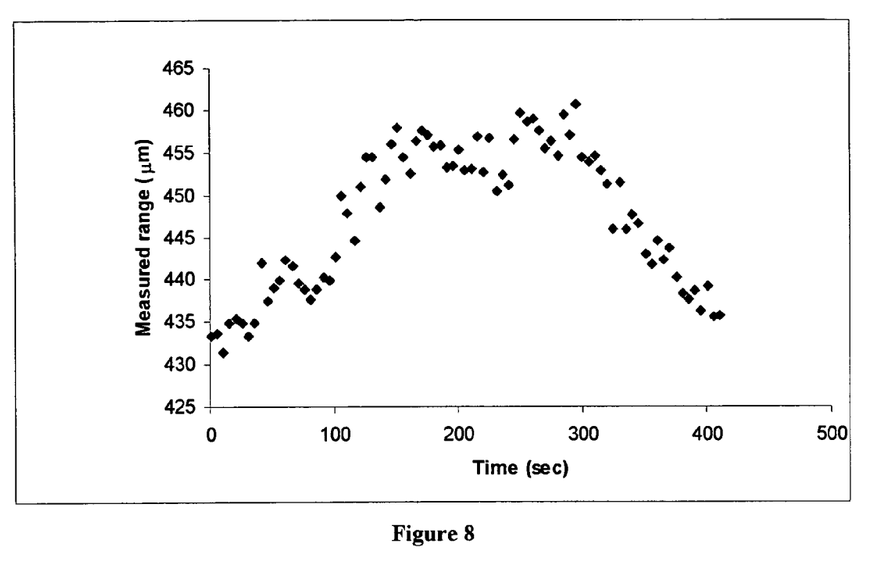
FIG. 8 depicts a temperature drift of the measured distance using the system shown in FIG. 1.

In FIG. 8 the result of the distance ranging measurement, using the system in FIG. 1, is shown. The result reveals large thermal drift of the system.

Figure 9:
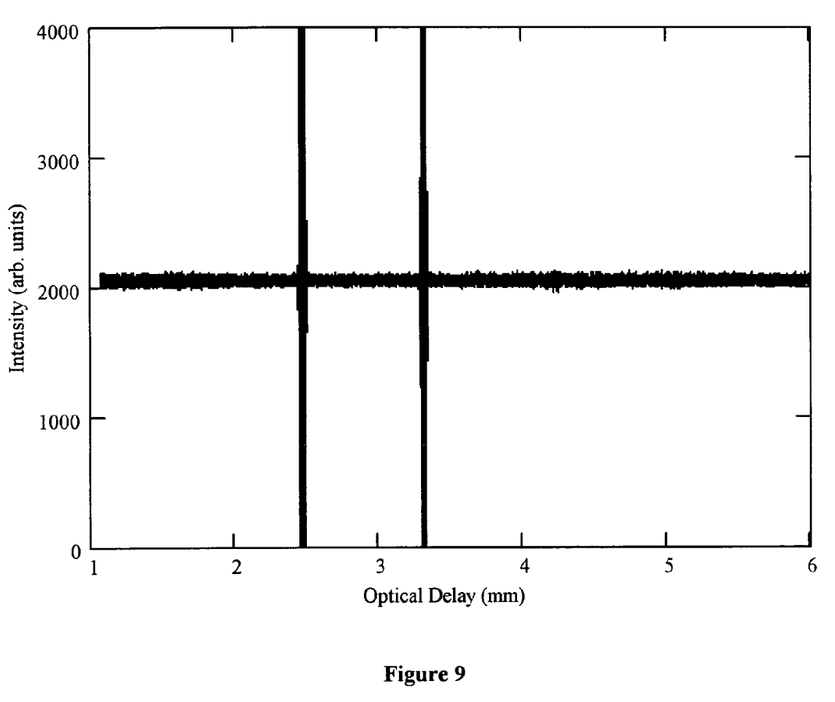
FIG. 9 depicts an interferogram of light reflected from reflective and nontransparent sample showing a probe with a reflective base element.

In FIG. 9 an interferogram of light is shown reflected from a reflective and nontransparent sample using a probe with a reflective base element as described in FIG. 4. The interferogram reveals two features. The left feature corresponds to reflection from a reflective base element, while the right feature represents reflection from a reflection from the specimen.

Figure 10:
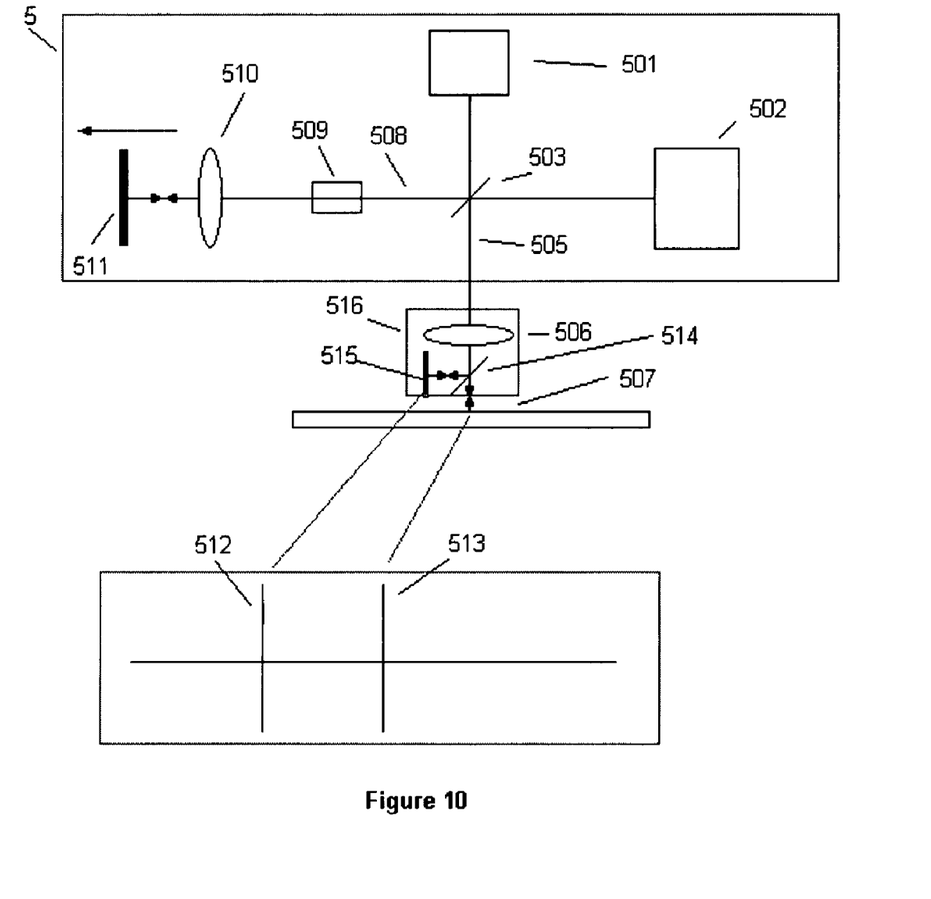
FIG. 10 represents a Michelson interferometer as shown in FIG. 1, in which a reflective base element is added, and the two reflections as shown in FIG. 9, are caused by the light, reflected from the reflective base element, and from the specimen, respectively.

FIG. 10 shows the low coherence interferometer already shown in FIG. 1, where a beam splitter 514 and a reflective base element 515, are added to the probe head 516. The reflective base element 515 is located closer to the beam splitter 514, than the specimen 507. When the reference mirror 511 moves from the right to the left (as shown in the Figure), the interferometer first comes to the condition when the optical path in the reference arm 508 becomes equal to the path to the reflective base element 515, and one can see the first interference peak 512 on a light detector 502, then it comes to the condition when the optical path in the reference arm 508 becomes equal to the path to the specimen 507, and one can see the second interference peak 513 on a light detector 503. By measuring the distance between the two said positions of the reference mirror 511, the position of the specimen surface, relative to the position of the reflective base element, is measured. The peaks 512, 513 structure is same as shown in FIGS. 6, 7, and 9. Peaks 512, 513 are shown as a light intensity vs the position of the reference mirror 511.

Figure 11:
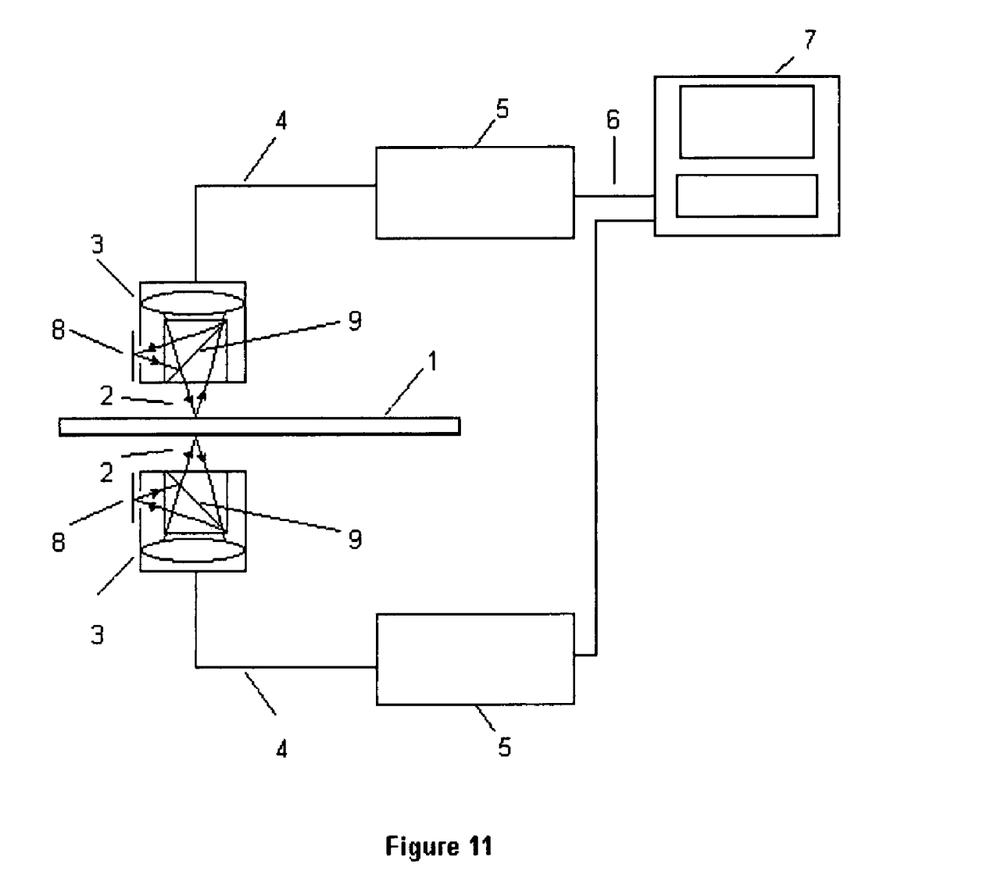
FIG. 11 represents two Michelson interferometers, as shown in FIG. 5, one having its probe head in proximity to one surface of the specimen, the other having its probe head in proximity to the other surface of the specimen.

FIG. 11 shows two Michelson interferometers 5, as shown in FIG. 5, one having its probe head 3, in proximity to one surface of the specimen 1, the other having its probe head in proximity to the other surface of the specimen.

In order to eliminate the influence of the thermal drift of the length of the optical path in fiber, the optical head is redesigned in such way as to introduce the additional reflective base element residing in the signal arm of the interferometer as discussed in FIGS. 2, 3, 4, and 5. The interferometer in this configuration is measuring the interference features resulting from the reflection from the reflective base element and reflections from the surface of the sample. A typical interferogram for such a measurement (in this particular case we used the configuration shown in FIG. 5) is shown in FIG. 9. The interferogram reveals two features, one corresponding to reflection from the reflective base element and a second feature corresponding to the reflection from the sample surface. The absolute position of each of these two features is subject to thermal drift due to changes of the refractive index in the optical fibers. The difference between the positions of these two features does not depend on drift of the optical path in fibers; both features suffer the same drift. The measurements using this configuration demonstrated that thermal drift was reduced to below 0.6 μm in 10 minutes interval.

What is claimed:

1. An apparatus for distance ranging of the surface of materials by means of an optical low coherence Michelson interferometer, comprising a reference and a sample arm, in which a sample arm of the interferometer comprises a single mode fiber-optic guide connected to a probe head where the probe head comprises a beam shaping assembly which directs and focuses a portion of the sample beam towards an interface of the specimen, which reflects a portion of the sample beam back to the interferometer, and a reflective means constituting a base interface which reflects a portion of the sample beam back to the interferometer, where the reflective means is mounted a certain distance from the probe head, where the probe head comprises a beam splitting means, which splits the sample beam into one portion and towards a reflective means and a second portion of the sample beam towards a reflective interface of the specimen; and a reference arm, which comprises a single fiber optic mounted on a stage for polarization control and connected to a collimator, which directs the beam toward s a reflective element, which resides on a delay stage.

2. The apparatus described in claim 1 in which the beam splitting means is a semitransparent mirror, where one of its interfaces constitutes a reflective means which reflects a portion of the sample beam back to the interferometer and constitutes a base interface.

3. The apparatus described in claim 1 in which the reflective base element is a partially reflective optical flat.

4. The apparatus as described in claim 1 for simultaneous distance ranging of an upper interface and a lower interface of a specimen wherein two probe heads of two independent interferometers are positioned such that light emanating from the first upper probe head propagates along the same line as the light emanating from the second lower probe head, in the direction towards the second probe head, while light emanating from the second probe head is propagating towards the first probe head, where both probe heads are separated by a certain distance allowing for the insertion of a specimen which is positioned in such a way that an upper and a lower interface of the specimen are approximately perpendicular to the direction of the propagation of light emanating from the probe heads.

* * * * *